March 16, 1954     A. R. GROSS     2,672,353
AUTOMOBILE TOW BAR WITH BUMPER CLAMP
Filed Jan. 11, 1951     2 Sheets-Sheet 1
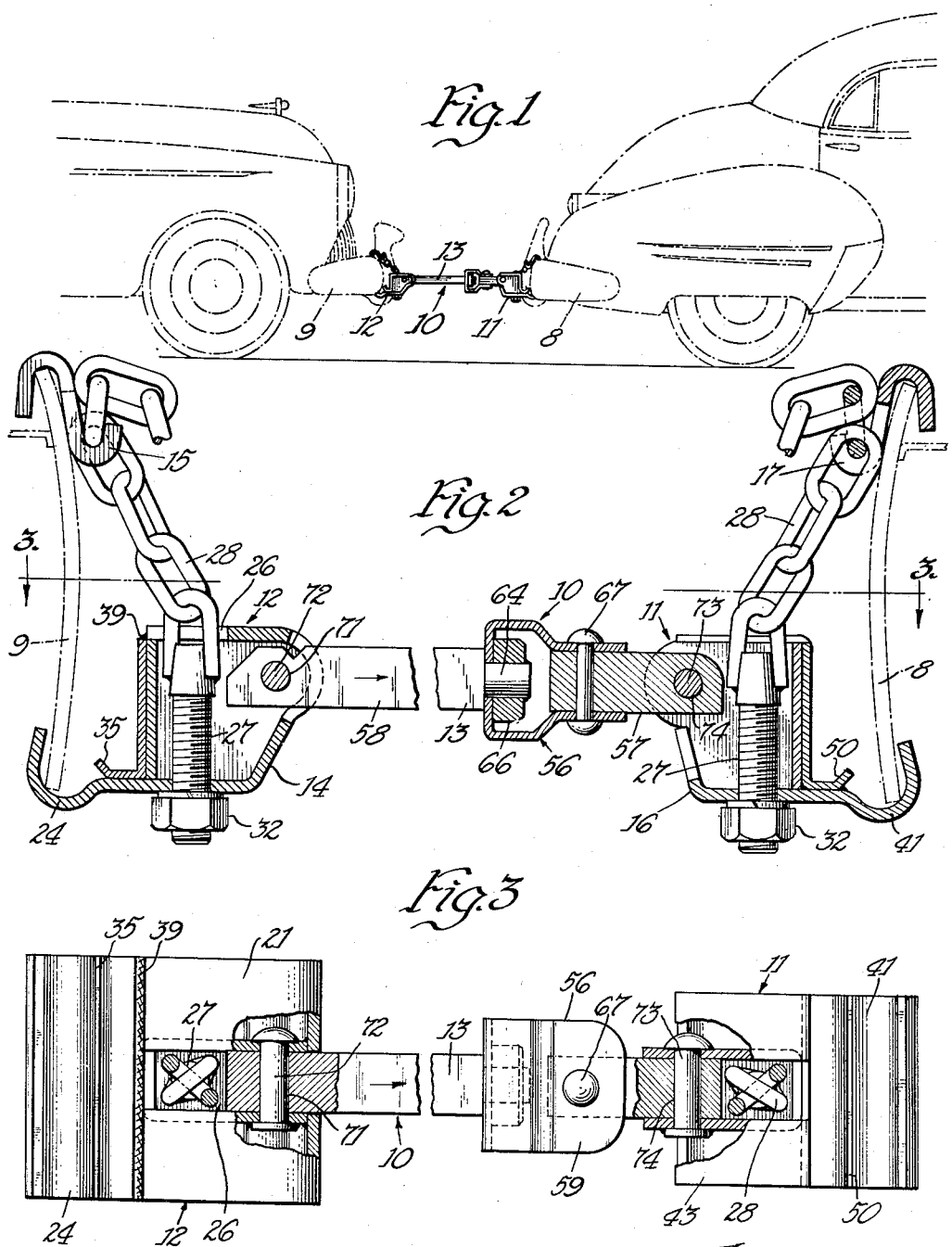

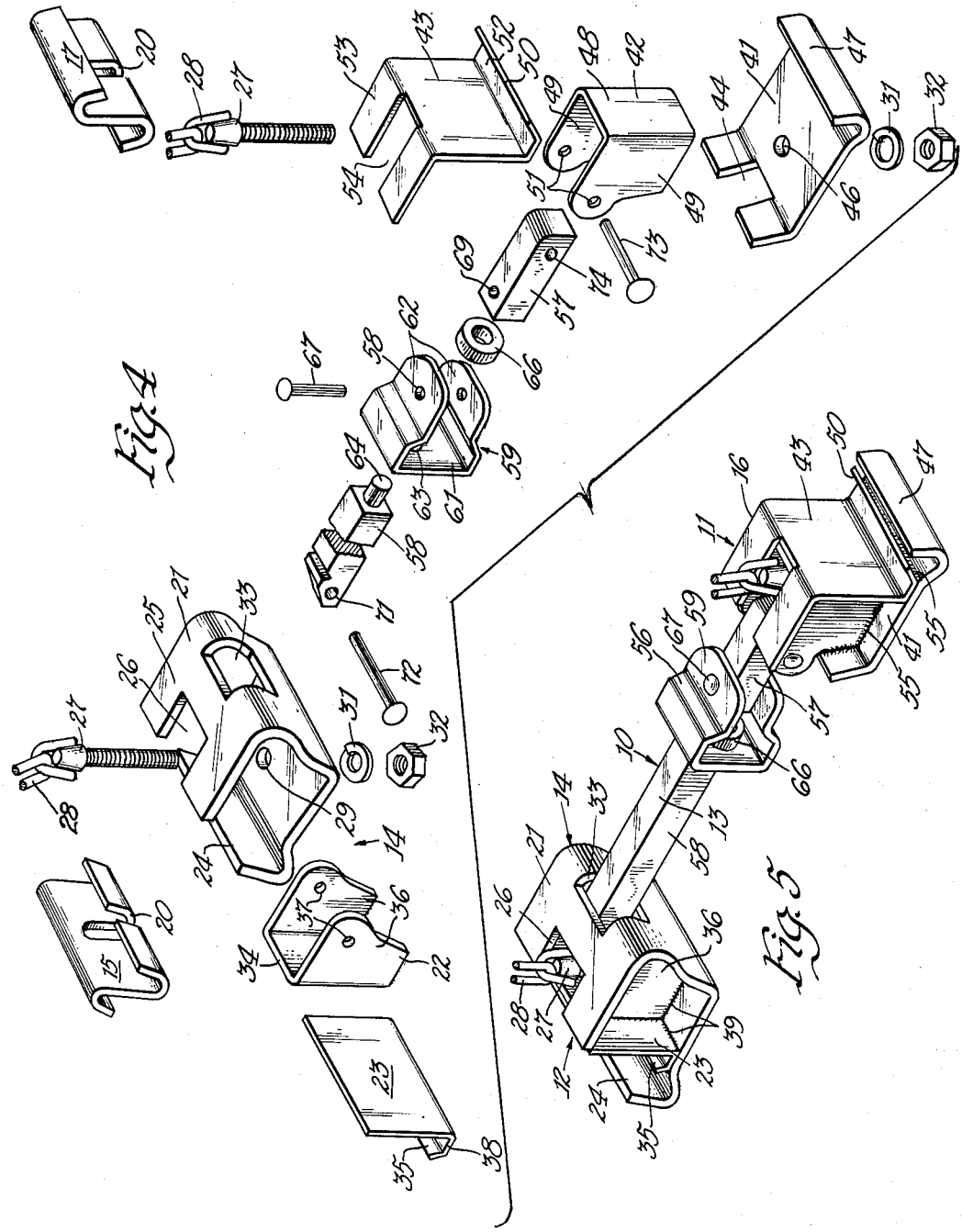

Patented Mar. 16, 1954

2,672,353

UNITED STATES PATENT OFFICE 2,672,353

AUTOMOBILE TOW BAR WITH BUMPER CLAMP

Arthur R. Gross, St. Paul, Minn., assignor, by mesne assignments, to Automatic Tow Bar Company, Inc., Minneapolis, Minn., a corporation of Minnesota Application January 11, 1951, Serial No. 205,574

7 Claims. (Cl. 280—505)

This invention relates to an improved automobile tow bar of the type adapted to relatively quick installation and particularly suitable for towing automobiles relatively short distances, as in intra-city and intra-state areas.

A tow bar for use in towing automobiles for short distances is preferably characterized by quick and easy adjustment to the vehicles, strength and safety in its operation, and being adapted to facilitate guiding the towed vehicle through city traffic. It is toward a tow bar having these features that this invention is directed.

One of the objects of my invention is to provide a tow bar of simplified design which is adapted to quick and efficient installation and removal from the towing and towed vehicles.

Another object of my invention is the provision of a tow bar in which the individual parts are inexpensively fabricated, but which, when assembled, produce a unit of unusual strength and safety.

A further object of my invention is a tow bar which is yieldable to the independent motion of the vehicle, but which increases the control and response of the towed vehicle, particularly as to steering.

A more specific object of my invention is to provide a tow bar with a universal joint action having improved strength and safety characteristics.

Further objects and advantages of the invention will be apparent from the following description and the accompanying drawings, in which similar characters of reference indicate similar parts throughout the several views.

In the drawings:

Fig. 1 is a side elevational view illustrating the installation and adaptation of a preferred embodiment of my invention as utilized for the towing of one automobile from another;

Fig. 2 is a vertical sectional view of the tow bar, drawn to a larger scale than Fig. 1, and depicting its attachment to automobile bumpers;

Fig. 3 is a plan view, partly in section, and viewed from a position indicated by line 3—3 of Fig. 2;

Fig. 4 is an exploded perspective view showing the component parts of the tow bar, shown in Figs. 1, 2 and 3; and Fig. 5 is a perspective view similar to Fig. 4, showing the component parts of the tow bar in assembled relationship.

In the preferred embodiment of the invention, as illustrated in the drawings, a tow bar 10 comprises a forward bumper clamp 11 and a rear bumper clamp 12 joined by connecting bar 13. The clamps 11 and 12 are adapted to engage the bumpers of the towing and towed vehicles; the bar 13, of course, furnishing the means of towing the rear vehicle.

Each of the clamps 11 and 12 comprise a pair of clamp jaws, those of the rear clamp being indicated at 14 and 15, and those of the forward clamp being indicated at 16 and 17. The upper clamp jaws 15 and 17 are of flat plate stock formed into a substantially S-shape and provided with a chain slot 20, Fig. 4. Preferably, each of the lower clamp jaws 14 and 16 are of sturdier and more rigid construction than the upper jaws 15 and 17. This is because the lower jaws provide the towing connections to the connecting bar and must be held in an upright relationship with respect to the bumper of each vehicle so that a lever action of the connecting bar 13 may be effective. The upper and lower jaws of each clamp are connected together, in use by a chain bolt arrangement, the chain engaging the upper clamp jaw and the chain bolt being secured to the lower clamp jaw.

The bumper clamps 11 and 12 are both subjected to the same general stress in straight pulling and, consequently, are of the same basic construction. However, the force necessary to secure adequate control over the rear vehicle, particularly in turning, makes it desirable to provide extra strength and rigidity in the rear clamp jaw 14. Such strength and rigidity is accomplished to a large extent by the design and relationship of the various component parts, which in themselves are simple and easily fabricated.

As shown in Fig. 4, the rear clamp jaw is made up of a jaw plate 21, a connecting plate 22, and an L-shaped stiffening plate 23. The jaw plate 21 is formed from flat stock into a generally U-shape, one leg of which has a jaw portion 24 suitably curved to fit over and grip the edge of an automobile bumper. Another leg 25 of the jaw plate is recessed to provide an opening 26 adapted to receive the chain bolt 27 which is interlocked with a chain 28. In alignment with the opening 26 is an opening 29 in an opposed leg 30 of the jaw plate through which the chain bolt 27 extends and in which it is held by a nut 32 and accompanying lock washer 31. The jaw plate 21 is provided with another opening 33 through which the connecting bar 13 extends in the assembly.

The connecting plate 22 is also formed from flat stock into a generally U-shape having a flat web or base portion 34 and opposed wings or legs 36. The size and shape of the plate 22 are made complementary to the inside of the jaw plate 21. The wings 36 of the connecting plate have aligned openings 37 therein for receiving a bolt, rivet, or the like, extending laterally of the clamp jaw. Stiffening plate 23 is L-shaped and made from a flat stock plate having one leg 38 curved back upon itself to afford rigidity and to provide a lip 35 which, in the assembly, extends along the jaw portion 24, in spaced relationship thereto.

In assembling the rear clamp jaw 14 the connecting plate 22 is placed within the jaw plate 21 with the wings 36 approximately equidistantly spaced from opposite sides of the opening 33. The complementary fit of the plates 21 and 22 causes the edges of wings 36 and web portion 34 to fit snugly within the jaw plate. Stiffening plate 23 with its turned end 38 extending outwardly is then placed against the web portion 34 of the connecting plate. The plates are then rigidly secured together as by welded seams 39, along all of their adjacent surfaces.

The forward clamp jaw 16 is similar to the rear clamp jaw in that it has a jaw plate 41, connecting plate 42, and a Z-shaped stiffening plate 43. The jaw plate 41 has a recess 44 therein for receiving the connecting bar 13, an opening 46 in the mid-portion thereof for receiving the chain bolt 27, and a jaw portion 47 for gripping the bumper of the forward vehicle. The connecting plate 42 is substantially U-shaped and has a flat web or base portion 48 and opposed wings or legs 49; the wings having aligned openings 51 therein. The stiffening plate 43 is Z-shaped in vertical cross section and includes a stiffening flange portion 52 integrally formed as one leg thereof and terminating in an angularly disposed lip 50, and spaced flanges 53 to provide an opening or slot 54 for receiving the chain bolt 27. The plates 41, 42 and 43 of the forward clamp jaw 16 are assembled and secured together by welded seams, such as 55, in a manner similar to that of the rear clamp jaw 14.

While the forward and rear clamp jaws are of the same basic design, it will be noted that in the preferred embodiment of the invention the rear clamp jaw 14 is of sturdier and more rigid construction than is the forward jaw 16. This is done to provide wider lateral gripping action and greater strength and leverage for effecting control of the towed vehicle, particularly in turning corners and the like.

The forward and rear clamps 11 and 12 are connected together by connecting bar 13. The bar 13 has a universal joint 56 intermediate its ends which divides the bar into two sections 57 and 58. The universal joint 56 utilized in the preferred embodiment of the invention is of simple but sturdy design. It comprises a yoke 59 of general U-shape having a web portion 61 and wings 62 in spaced and opposed relationship. In the mid-portion of the web 61 is an opening 63 which rotatably receives a cylindrical end portion 64 on the forward end of the bar section 58 which is integral with and projects longitudinally from the bar section 58. A collar 66 is welded onto the end of the cylindrical end portion 64 of the bar section to secure that bar section to the yoke, while preserving the rotatable relationship between those connected parts. This rotational relationship of the bar sections eliminates torsional stress which would otherwise result from the relative tilting of connected vehicles during use of the tow bar.

The connecting bar section 57 is pivotally secured to the yoke 59 by a pin or rivet 67 which extends through aligned openings 68 and 69 in both the yoke and one end of the bar section. This pivotal connection constitutes a point of control of the rear vehicle as for effecting turning and the like. As the forward vehicle turns, the bar section 57 is moved out of lateral alignment with bar section 58, the continued pull of the forward vehicle forces the rear vehicle to turn and thereby effects return of the rear bar section 58 back into alignment with the forward bar section.

The position of the universal joint with respect to the length of the connecting bar 13 has been found to be important in obtaining more effective control of the towed vehicle. Although practical considerations dictate that the connecting bar shall be as short as possible, the rear bar section 58 must be of substantial length in order to provide leverage for forcing the rear vehicle to turn with practically instantaneous response to the controlling movements of the towing vehicle. It is with the foregoing considerations in mind that I have placed the univeral joint in the forward half of the bar 13. In this position, the action of the bar, when the forward vehicle is turning, is such that considerable leverage is exerted on the rear vehicle, because of the length of bar portion 58.

The connecting bar 13 is pivotally secured to both the front clamp jaw and the rear clamp jaw. In each instance, the axis of the pivotal connection of an end of the bar to one of the clamp jaws is horizontal when the tow bar is in use, so that flexibility in the plane steering forces is avoided, while the bar permits relative movements of the vehicles caused by unevenness of roads over which they pass. As shown in Figs. 2 and 3, the rear bar section 58 extends through opening 33 of the rear clamp jaw 14 and between the wings 36 of the connecting plate. An opening 71 in the bar section 58 is aligned between openings 37 in the plate; the bar section being secured in place by a pin 72. The forward bar section 57 is similarly secured to the forward clamp jaw 16 by pin 73 extending through opening 74 in the bar section and aligned openings 51 in the connecting plate 42. These pivotal connections of the bar 13 to the front and rear clamps 11 and 12 eliminate stress on the bar when the forward and rear vehicles are displaced vertically with respect to each other.

In the disclosed structure, front and rear clamps 11 and 12 are secured to the vehicle bumpers 8 and 9 by chain bolt 27 and chain 28 connecting the upper and lower clamp jaws of each clamp. In securing the rear clamp 11, as shown in Fig. 2, upper clamp jaw 15 is hooked over the upper edge of the vehicle bumper 9 and the jaw plate 21 of the lower clamp jaw is placed under the lower edge of the bumper. Chain bolt 27 is then placed through openings 26 and 29 of jaw 14 and the washer 31 and the nut 32 engaged thereon. The appropriate link of chain 28 giving the tightest fit is placed in slot 29, such link being held in place by the seating of the next upper link. The nut 32 of the chain bolt is then tightened until a rigid, non-slip engagement of the clamp to the bumper is effected. The front clamp 11 is similarly secured to the bumper 8 of the front vehicle. This arrangement of attaching the clamps permits instant and efficient securement of the tow bar to the vehicle bumper.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A clamp jaw comprising a first part having a clamping flange, a second part in the shape of a U having legs each provided with a hole adjacent one side of the leg, said flange being disposed outward of the base of the U-shaped part and said first part engaging the edge of the side of each leg thereof away from the side to which the hole is adjacent, the first part also having a slotted region engaging the end edges of the U-shaped part, and a Z-shaped part having the face of the web thereof in engagement with the outer face of the base of the U-shaped part, and the face of a leg of the Z-shaped part in engagement with the first part, the three aforementioned parts being secured to one another.

2. The clamp jaw specified in claim 1, the said one leg of the Z-shaped part having a lip arranged in spaced facing relation to the clamping flange, the first part and the Z-shaped part being wider than the U-shaped part so as to extend outwardly of the legs thereof.

3. A clamp jaw comprising a first U-shaped part having a long leg provided with a clamping flange at its free end, a short leg provided with a slot at its free end, and a base provided with an opening adjacent the short leg; a second U-shaped part having a hole in each leg near the free end and one side edge thereof, said flange being disposed outward of the base of the second part and the long leg of the first part engaging the edge of the side of each leg of the second part away from the side to which the hole is adjacent, and said short leg provided with the slot engaging the side edges of the econd part, an L-shaped part, the second U-shaped part lying within the first U-shaped part with the planes of the legs of the U's transverse to one another, the holes in the legs of the second part being adjacent the short leg of the first part and the opening in the base thereof, and the edges of the base of the second part engaging the inner face of the long leg of the first part and the free end of the inner face of the short leg of the first part in bridging relation to the slot in the said short leg, the outer face of one leg of the L-shaped part engaging the outer face of the base of the second part, the outer face of the other leg of the L-shaped part engaging the inner face of the long leg of the first part, and the three aforementioned parts being secured together.

4. The clamp jaw specified in claim 3, each leg of the second part being longer at the region containing the hole than at the remainder of the leg and being rounded at the free edge beyond the hole, the region of the base of the first part containing the opening being correspondingly rounded to fit the rounded free edges on the legs of the second part.

5. A clamp jaw comprising a first part having a clamping flange at one end and spaced projections at the other end defining a slot, second part in the shape of a U, and a third part in the shape of a Z, one face of the first part engaging the U-shaped part at one base edge and at one side edge of each leg, each of said legs having an opening adjacent the opposite side edge and the free end, one face of each projection on the first part engaging the end edge of one leg of the U-shaped part adjacent the said one side, the Z-shaped part having the outer face of one leg in engagement with the said one face of the first part and the outer face of the web in engagement with the outer face of the base of the U-shaped part, the three aforementioned parts being secured together.

6. The clamp jaw specified in claim 5, the leg of the Z-shaped part engaging the base of the U-shaped part comprising spaced flanges engaging the side edges of the U-shaped part to which the said holes are adjacent.

7. The clamp jaw specified in claim 6, the spaced flanges of the Z-shaped part extending along the side edges of the legs of the U-shaped part as far as the openings in the legs, each leg of the U-shaped part being longer at the region containing the hole than at the remainder of the leg and being rounded at the free edge beyond the hole.

ARTHUR R. GROSS.

References Cited in the file of this patent

UNITED STATES PATENTS

| Number | Name | Date |
|---|---|---|
| 1,730,077 | Isachsen | Oct. 1, 1929 |
| 2,306,388 | Johnson et al. | Dec. 29, 1942 |
| 2,338,934 | Gross | Jan. 11, 1944 |
| 2,444,086 | Baker, Jr. | June 29, 1948 |
| 2,446,218 | Dunlap | Aug. 3, 1948 |
| 2,472,325 | Williams | June 7, 1949 |
| 2,488,415 | Klein | Nov. 15, 1949 |